United States Patent Office 3,396,272
Patented Aug. 6, 1968

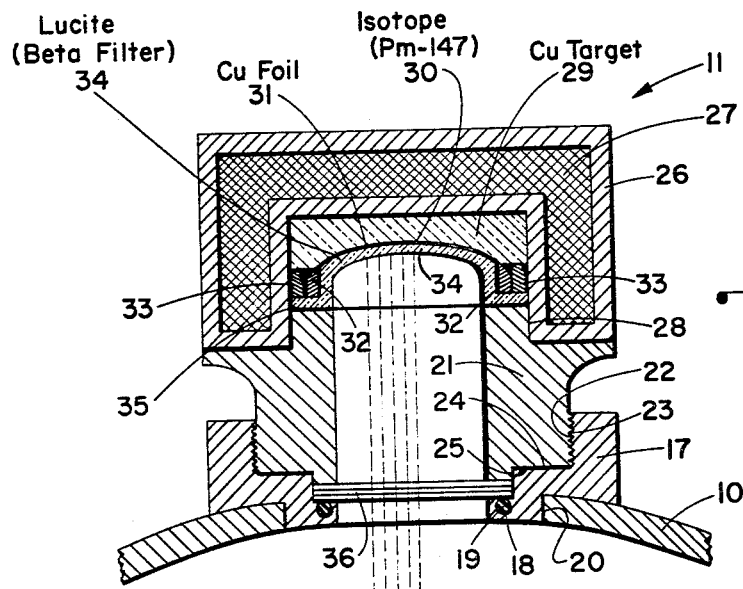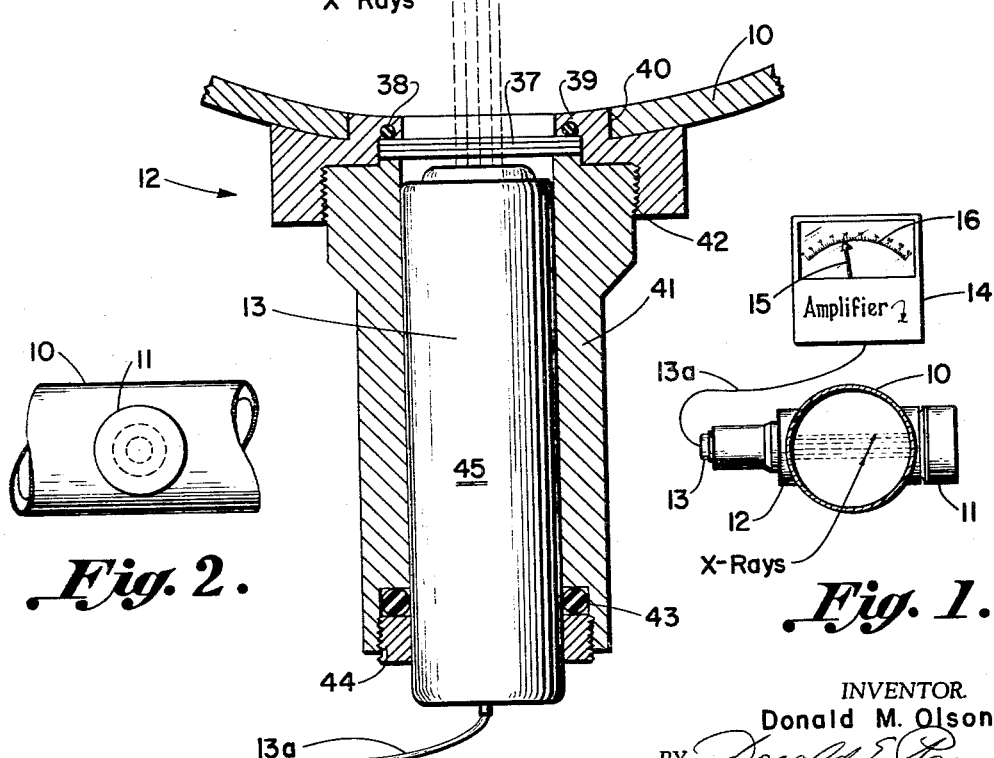

3,396,272
ISOTOPE-POWERED X-RAY INSTRUMENT FOR DETECTING THE ARRIVAL OF AN INTERFACE IN A PIPELINE
Donald M. Olson, Santa Fe, N. Mex., granted to United States Atomic Energy Commission under provisions of 42 U.S.C. 2182
Filed Oct. 26, 1964, Ser. No. 406,311
10 Claims. (Cl. 250—43.5)

ABSTRACT OF THE DISCLOSURE

Detects arrival of interface in a pipeline with an X-ray generator-detector system wherein $Pm^{147}$ is deposited on concave surface of copper reflection target, a very thin copper foil and a "Lucite" filter are positioned between the $Pm^{147}$ and a beryllium window, and a collimator is between said filter and said window.

Background of the invention

This invention relates to an isotope-powered X-ray instrument for determining the presence of particular substances in a closed system and it pertains more particularly to an instrument for use on product pipelines to show the arrival of an interface.

Ever since the petroleum industry began the transportation of products through pipelines it has been confronted with the problem of tracing or detecting the interface between different products flowing in the line and determining the precise time of arrival thereof at the products' destination. Many proposals were made which involved the use of radioactive tracers in the flowing streams as shown, for example in U.S. 2,835,699 which proposes the use of oil soluble sulfonates of $Cs^{134}$ and/or $Cs^{137}$. Other proposals included the use of infrared radiation (2,570,064), the use of a dielectric sensitive capacitance type cell (2,783,420), the use of a thermistor for determining relative temperature increases (2,828,479), etc. A simple $Fe^{55}$ X-ray source is shown in U.S. 3,144,559 and 3,256,430. None of the previous proposals has been entirely satisfactory, and an object of this invention is to provide an instrument which will be more fool-proof in operation and more accurate in performance than devices heretofore proposed. A further object is to provide an instrument which does not require an external power source, i.e., which has the power source built in as a part of the instrument itself. An important object is to avoid the necessity of introducing any substance whatsoever into the pipeline and to avoid the necessity of withdrawing material therefrom or otherwise interfering the flow therein. A still further object is to provide an instrument that can readily be calibrated to take care of differences in density and other variable conditions.

Summary of the invention

In practicing my invention I place on opposite walls of the pipe, or other closed system, windows which will withstand the fluid pressure in the closed system, and which will be impervious to the passage of said fluid therethrough but which will permit the ready passage therethrough of X-rays. On the outside of one of the windows I provide a shielded and sealed, isotope powered X-ray generator positioned to transmit X-rays through said window and through substance in the closed system (pipe) to the opposite window. On the outside of the opposite window I employ a scintillation detector which will produce a signal proportional to the quantity of unabsorbed X-rays which reach it. This signal may be indicated by a reading on a dial, by an audible noise, or by instrumentation which makes written records and/or which operates valves, pumps or other mechanism to insure that each product reaches its proper tank with minimum product loss.

My instrument is powered by a radioactive isotope, preferably one which emits beta radiation in the region of .2 m.e.v., an example of a suitable isotope being $Pm^{147}$ which has a half-life of about 2.6 years. If isotopes are used which are direct gamma emitters (X-rays), e.g. $Cs^{137}$, it may be used in place of the transmission and reflection targets which are required when only a beta emitter is employed and the X-rays are produced by secondary emission. The $Pm^{147}$ is preferably deposited on the concave surface of a reflection target which may be of copper, iron, molybdenum or the like, the amount of the isotope being dependent on the isotope used and the intensity of X-rays which is desired, about 250 millicuries of $Pm^{147}$ being a particular example. A very thin foil of the target metal, of the order of 0.0005 inch, is held against the deposited isotope. A filter permitting the passage of X-rays but preventing the passage of beta rays, preferably a thin layer of methacrylate ester polymer ("Lucite"), is in intimate contact with the foil, and a collimator is preferably employed between the filter and the window, which is preferably of beryllium. The X-ray generating portion of the instrument is shielded and sealed.

Opposite to the X-ray generator is the scintillator detector or proportional counter, which may be of any conventional type, and which is placed against the beryllium window opposite from the X-ray generator. The scintillation detector can provide a visual, audible and/or an electrical signal which is proportional to the unabsorbed X-rays which reach it and which thus can be made to indicate the nature of the material that is at any instant between the respective windows. Experiment has shown that the decrease in intensity $I$ of an X-ray beam as it passes through any homogeneous substance is proportional to the distances traversed, $x$. In differential form: $dI/I = \mu dx$, where the proportionality constant $\mu$ is the linear absorption coefficient and is dependent on the density of the substance and the wave length of the X-ray beam. Integration of this equation gives $I_x = I_0 e^{-\mu dx}$, where $I_0$ is the intensity of the incident X-ray beam and $I_x$ is the intensity of the X-ray beam reaching the detection unit after passing through a thickness $x$. Since the linear absorption coefficient $\mu$ is proportional to density $p$, this means that the quantity $\mu/p$ is a constant of the material and is independent of its physical state (solid, liquid or gas). This quantity known as the "mass absorption coefficient" is the one usually tabulated. The former equation can be written in the more usual form: $I_x = I_0 e^{-(\mu/p)px}$.

When it is necessary to know the mass absorption coefficient of a substance containing more than one element (the unknown can be a solution, chemical compound, or mechanical mixture and be in any state, solid, liquid or gaseous) its "mass absorption coefficient" is simply the weighted average of the mass absorption coefficients of its constituent elements. (Ref. B. D. Culty: Elements of X-ray Diffraction, Addison-Wesley, 1959, p. 10.)

Thus my instrument operates on the principle that a beam of X-rays is absorbed in any substance to a measurable extent and this degree of absorption can be correlated with density, composition, and many other properties of the substance. Products or materials in a closed system such as a pipeline can thus be continuously checked for uniformity, composition, interfaces of materials in transmission lines, etc.

Description of preferred embodiment

The invention will be more clearly understood from the following detailed description of a preferred embodiment thereof, read in conjunction with the accompanying drawings which form a part of this specification and in which:

FIG. 1 is a diagrammatic representation of my X-ray generator and scintillation detector on opposite sides of a pipe, the scintillation detector being connected to an amplifier and indicator system, FIG. 2 is a side view of the X-ray generator attached to a pipe, FIG. 3 is a section through the X-ray generator, and FIG. 4 is a corresponding section through the detector system.

In this embodiment of my invention a pipeline 10 is employed to transport petroleum products such as gases, gasolines, naphthas, fuel oils, kerosenes, various refined oils, etc. As soon as one batch is pumped into the pipe another batch of a different material is pumped into it and there is an interface of sorts between the two batches. The instrument I will now describe may monitor the flow through the pipe to check the uniformity thereof. Particularly it is to indicate when the interface reaches its destination so that steps can be taken to get each product in its proper tank with a minimum of mixing and loss.

On one side of pipe 10 is my improved X-ray generator 11 which is shown in detail in FIG. 3. On the other side of pipe 10 is the detector system 12 which is shown in detail in FIG. 4. The X-ray generator 11 is securely attached to pipe 10 as shown in FIG. 1 and FIG. 2 and as will be later described in detail. The scintillation detector 13 of the detector system 12 may be connected by a line or cable 13a to an amplifier 14 which operates mechanism for moving indicator needle 15 across scale 16, etc. Any other known indicating means may of course be used, and if desired the signal from cable 13a may actuate mechanism for opening and closing valves, starting and stopping pumps, etc.

Referring to FIG. 3, a stainless steel adapter 17 is secured, preferably by welding, to pipe 10 around an opening therein which in this case is about 2" in diameter. A circumferential groove 18 contains an O-ring seal 19. Cylindrical surface 20 of adapter 17 fits snugly into the pipe opening. Above the adapter 17 is an annular collimator element 21 having threads 22 which engage threads 23 on adapter 17, so that bottom flat surface 24 of the collimator element may be driven toward the top surface 25 of adapter 17. Housing 26 surrounds the inner and outer surfaces of the body of lead 27 that provides the necessary shielding against radiation losses, the inner wall of housing 26 being forced into a pressed fit against cylindrical surface 28 of the collimator and sealed thereto when the other elements of the instrument are all in place.

Fitting within the top of the inner housing is a reflection target 29 which may be of iron, molybdenum or the like but which in this example is copper and which is provided with a concave lower surface. Deposited on said concave surface in this example is 250-millicurie of the radioisotope $Pm^{147}$ which has a half life of about 2.6 years and an energy of about 0.2 m.e.v. beta emission. Pressed immediately against the radioisotope deposit is copper transmission target foil 31, which in this example is about 0.0005 inch thick, the circumferential edges of the foil 31 being held between rings 32 and 33 so that the foil's curvature may precisely match the concave curvature at the bottom of reflection target 29 when the filter 34 is in place. Immediately below the foil 31 and in intimate contact therewith is a sheet of methacrylate ester polymer ("Lucite") 34 which in this example is about 0.05 to 0.06 inch thick, and which acts as a filter to hold back beta radiation while permitting the passage therethrough of X-rays. This filter element 34 may be milled from a solid cylinder of Lucite, its peripheral flange may be about 0.12 inch thick and its thinner cone-shaped top being milled to fit precisely the curvature of the bottom of the reflection target. After the above described elements are properly placed, epoxy cement 35 is applied around the bottom edge of the outer flange of filter 34 so that when the lead shielding housing is forced down onto the collimator element the whole X-ray generating unit will be hermetically sealed as well as being effectively shielded. This sealed and shielded unit may now be screwed into adapter 17 to hold window 36 against Teflon O-ring seal 19. The window 36 in this example is a beryllium sheet about 0.06 inch thick so that it will withstand the pressure of fluids in the pipe but let the X-rays pass freely through the opening in the pipe walls.

Referring next to FIG. 4, another beryllium window 37 is held against O-ring seal 38 in adapter 39 which is welded around opening 40 in pipe 10 opposite window 36. Tubular case or holder 41 is screwed into the threaded opening 42 of adapter 39, thus holding window 37 in place. An O-ring seal 43 may be tightened by hollow nut 44 against the circular walls of proportional counter or scintillation detector 45, which in turn may be connected by an electrical cable or other known means to known types of amplifiers, indicators and controls for operating mechanisms.

The operation of my instrument will be apparent from the foregoing description. It may first be calibrated by passing each of the petroleum products in turn through the pipe between the windows and noting the corresponding reading of the needle on scale 16. Thereafter, the indicator will show which of the products is between the windows, and may even indicate any deviations in product composition. It will enable instantaneous and sharp determination of the passage of any interface, and the signal transmitted through cable 13a may control operating mechanism for properly routing each stream. And it should be noted that no foreign matter whatsoever has to be added to the stream of fluids that are flowing in the pipe. No restrictions in the pipe and no interruption in flow are required. No source of power is necessary other than what is built into the instrument itself. No fluids have to be withdrawn for the purpose of testing. If and when a different isotope is employed or a different X-ray wave length is passed through the fluids between the windows, it may be necessary to recalibrate the instrument, but that is of course a simple matter. A particular advantage is the fact that no electrical excitation or cooling equipment of any kind is required for the X-ray source.

While I have described in detail a specific embodiment of my invention, it should be understood that this is by way of example, and that alternative arrangements, materials, and operations will be apparent from the foregoing disclosure to those skilled in the art.

I claim:

1. An isotope-powered X-ray instrument for determining the presence of particular materials in a closed system having opposite walls with said instrument on one side thereof and a detector on the other, which instrument comprises:

(a) an adapter secured to one of the walls around an opening therein,
   (b) a window sealed in the adapter around the opening to withstand pressures in the closed system, said window being impervious to the materials but pervious to X-rays,
   (c) a collimator element,
   (d) a filter for passing X-rays and preventing the passage of beta radiation through the collimator element and the window,
   (e) a thin transmission target foil immediately adjacent said filter,
   (f) a radioisotope which emits beta radiation in the region of .2 m.e.v. immediately adjacent said target foil and on the front surface of
   (g) a reflection target, said filter, target foil, radioisotope and reflection target being retained within a
   (h) shielding element on all sides except the side directed through the collimator element which, in turn, is interposed between the shielding element and the adaptor, and a (i) seal between the shielding element and the filter for preventing contaminating material from escaping from the instrument, whereby beta radiation from the isotope is converted to X-rays which are directed through materials in the system having different absorption coefficients so that the detected amount of unabsorbed X-rays reaching the opposite wall of the system provides an indication of the particular material which is present in the system.

2. The instrument of claim 1 wherein the isotope is $Pm^{147}$.

3. The instrument of claim 1 wherein the window is beryllium.

4. The instrument of claim 1 wherein the target is copper.

5. The instrument of claim 1 wherein the filter is a methacrylate ester polymer.

6. The instrument of claim 1 in which about 250 millicuries of isotope is deposited on a concave surface of the reflection target, a transmission target foil about 0.0005 inch thick is held against the concave surface containing the isotope, and a concave filter about 0.05 inch thick is held against the foil.

7. In a closed system having opposite walls withstanding a fluid pressure, a first window which withstands said pressure, which is impervious to the passage of fluid and which permits the passage of X-rays, a shielded and sealed, isotope-powered X-ray generator positioned to transmit X-rays through the first window and through material in the system toward a point on the opposite wall, a second window at said point on the opposite wall which is similar to the first window, and a scintillation detector in line with a second window for producing a signal proportional to the quantity of unabsorbed X-rays which pass through the second window, the improved X-ray generator which comprises:

(a) an X-ray reflection target having a concave lower surface, (b) a radioactive isotope which emits beta radiation in the region of .2 m.e.v. deposited on the lower side of said surface, (c) a very thin foil of the target metal on the lower side of the isotope, (d) a beta ray filter below the thin foil, and (e) a collimator between said filter and said first window.

8. The combination of claim 7 which includes an amplifier and an indicator operatively connected to the scintillation detector.

9. The combination of claim 7 in which the closed system is a pipeline for transporting materials having different absorption characteristics.

10. The instrument of claim 1 in which the closed system is a pipeline for transporting different fluids each of which has a characteristic absorption characteristic.

References Cited

UNITED STATES PATENTS

| | | | |
|---|---|---|---|
| 3,144,559 | 8/1964 | Forrester et al. | 250—43.5 |
| 3,204,103 | 8/1965 | Johnson et al. | 250—106 |
| 3,256,430 | 6/1966 | Amrehn | 250—43.5 |

OTHER REFERENCES

Nucleonics, by Reiffel, vol. 13, No. 3, March 1955, pp. 22 to 24.

RALPH G. NILSON, *Primary Examiner.*

A. L. BIRCH, *Assistant Examiner.*